Aug. 30, 1932.    V. G. APPLE    1,875,207

ALTERNATING CURRENT MOTOR

Filed Dec. 11, 1930

INVENTOR

Vincent G. Apple

Patented Aug. 30, 1932

1,875,207

UNITED STATES PATENT OFFICE

VINCENT G. APPLE, OF DAYTON, OHIO

ALTERNATING CURRENT MOTOR

Application filed December 11, 1930. Serial No. 501,578.

This invention relates to alternating current motors, and particularly to alternating current motors having the stator core and coils imbedded in a mass of insulation which forms the housing for the motor.

An object of the invention is to so arrange the end turns of the stator coils and so mold the end wall of the housing about the said end turns as to shorten the completed structure considerably, thus providing motors adapted to situations in which length is a consideration.

Another object is to form the housing of my motor of an impervious insulation and imbed the stator core therein and completely enclose the stator windings in the wall of said housing then employ a rotating element which requires no commutator nor brushes, to the end that large ventilating openings may be made through the housing wall, normally for air circulation, but through which a considerable volume of water or other foreign substance may pass with no injurious results.

I attain these objects in the structure hereinafter described and shown in the accompanying drawing wherein—

Similar numerals refer to similar parts throughout the several views.

Figure 1:
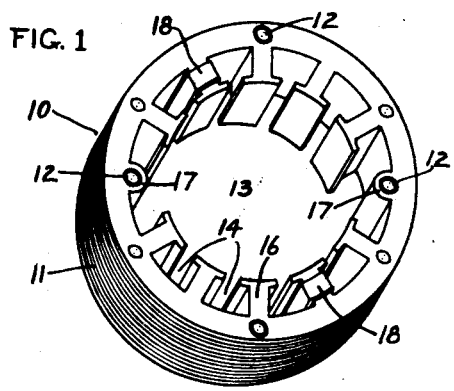
Fig. 1 shows the stator core of my motor with shading coils around two of the teeth.

The stator core 10 comprises a plurality of laminae 11 held together by tubular rivets 12. A large central opening 13 is provided for a rotor. Winding apertures 14 surround the central opening 13 and are separated by teeth 16. To adapt the core to a bipolar winding two of the teeth are eliminated and bosses 17 are substituted therefor. To facilitate starting the motor two of the teeth carry the shading coils 18.

Figure 2:
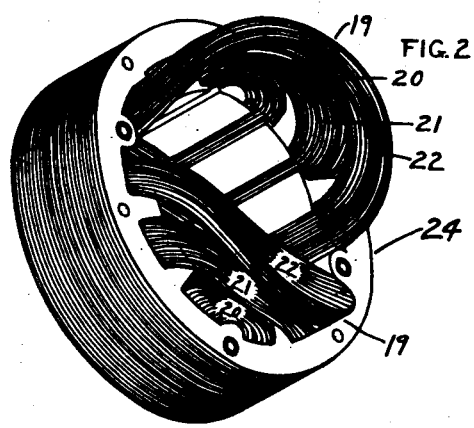
Fig. 2 shows the core as viewed from the bottom when the complete winding is in place.
Figure 3:
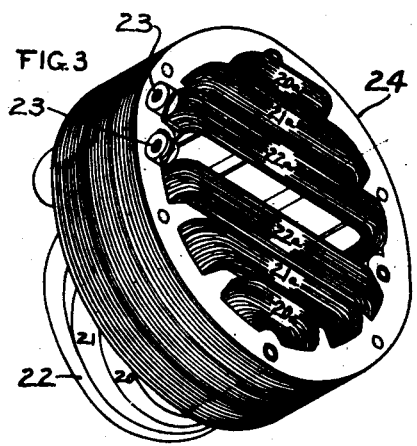
Fig. 3 shows the core as viewed from the top when the complete winding is in place.

The main winding comprises two coils 19, each made up of three interconnected parts, the end turns 20, 21 and 22 of which, at the bottom of the core, (see Fig. 2) are laid one above the other, while the end turns 20a, 21a and 22a, at the top of the core, (see Fig. 3) are laid side by side, the object being to throw the end turns back clear of the diameter of the central opening 13 at the bottom of the core Fig. 2, but to allow them to cross the central opening at the top Fig. 3.

In the finished structure a rotor may be entered between the pairs of end turns 20, 21 and 22 at the bottom of the core but not from the top. By arranging the winding as shown in Figs. 2 and 3 the axial length of the motor is shortened an amount equal to the length taken by the coil sections 21 and 22 at the bottom end of the core. Tapped metal terminals 23 are attached, one to each end of the winding for conveying current from the line. The structure as it appears in Figs. 2 and 3 may be broadly designated by the numeral 24.

Figure 4:
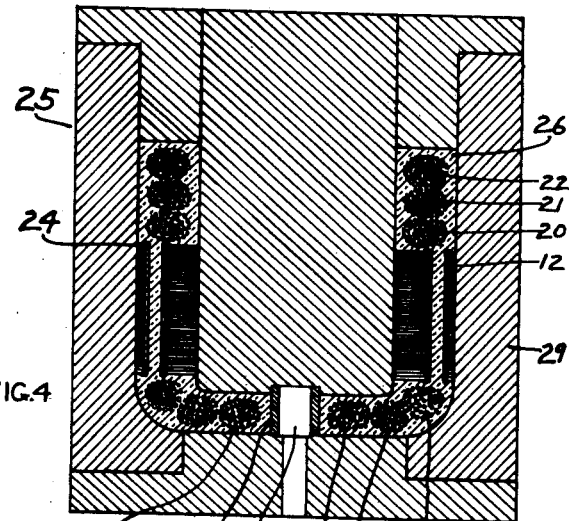
Fig. 4 shows the core Figs. 2 and 3, bottom up in a mold in which insulation has been compressed about the core and winding, the section through the stator being as though taken at 4—4 of Fig. 5.
Figure 5:
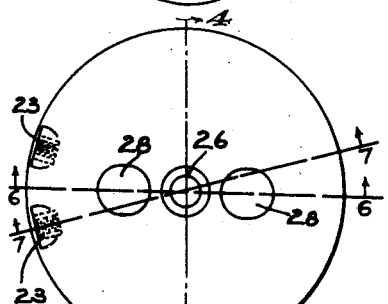
Fig. 5 is a top plan view of the completed motor.

Fig. 4 shows the structure 24 in a mold 25 with a body 26 of insulation molded about the end turns 20, 21 and 22, extending downwardly through the tubular rivets 12, between and about the end turns 20a, 21a and 22a. The end turns 22a are spaced apart sufficiently to allow the bearing bushing 26 to go between them and be held in place by the stud 27 of the mold while molding is being effected. Space is also made between end turn 22a for the ventilating openings 28. (See Figs. 5 and 6.) The terminals 23 are also supported in the mold while molding is taking place by pins (not shown) entering laterally through the side wall 29 of the mold. Because the two bosses 17 are shorter than the teeth 16 there are left two spaces which are filled by struts 31 of insulation, (see Fig. 6) which connect the heavier masses at the ends of the core. The insulation also flows through those portions of the winding apertures not filled by the winding, forming covers over the coil sides 30, as at 32, Fig. 7.

Figures 6, 7:
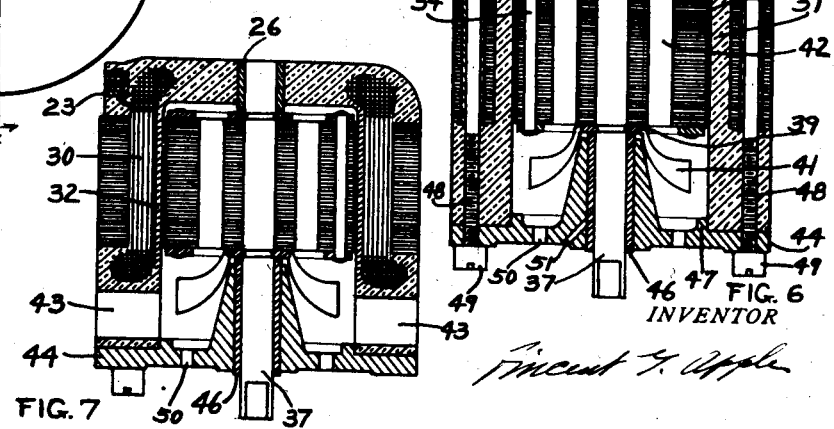
Fig. 6 is a vertical axial section taken at 6—6 of Fig. 5.
Fig. 7 is a vertical axial section taken at 7—7 of Fig. 5.

The axial section Fig. 6 shows a squirrel cage rotor 33 with the inductors 34 and end rings 36 mounted on a shaft 37. A small washer 38 is staked to the shaft at the upper end of the core and a larger stamping 39 at the lower end to hold the core against endwise movement on the shaft. The stamping 39 has impeller blades 41 formed at its outer edge to provide air circulation for the motor. The rotor core has axial openings 42 to conduct air from the ventilating openings 28 to the impeller. Radial discharge openings 43, Fig. 7, extend through the housing wall at points between the coils. A bearing head 44 carrying the bearing bushing 46 is held in concentric relation to the housing by the annular rib 47. Studs 48, imbedded in the insulation, and nuts 49, hold the head in place. Oil holes 51 and 52 are provided through which to lubricate the bearings, and small holes 50 extend through the head to the interior of the motor.

From the foregoing description and drawing it will be seen that by arranging the end turns of the coils in the peculiar manner shown and described then molding the end wall of the housing to include them, a considerable saving in the length of the motor is effected. Also because of the fact that there is no commutator or brushes and no winding on the rotor which need be insulated and because the stator windings are completely enclosed in an impervious wall of insulation the motor is not less effective because of the ventilating openings in the housing, for water may be poured in the openings 28, and, outside of retarding the motor speed temporarily until the water runs through, no ill effect may be noticed.

Having thus shown and described an embodiment of my invention,

I claim,

1. A dynamo electric machine stator comprising, a core having a central rotor opening and a plurality of spaced apart winding apertures around said central rotor opening, coils of insulated wire in said winding apertures, the end turns of said coils at the one end of the core being laid one above the other so as to clear said central rotor opening and at the other end of the core being laid side by side and extending across said central rotor opening so as to substantially close the said opening.

2. A dynamo electric machine stator comprising, a core having a central rotor opening and a plurality of spaced apart winding apertures around said central rotor opening, coils of insulated wire in said winding apertures, the end turns of said coils at the one end of the core being laid one above the other so as to clear said central rotor opening and at the other end of the core being laid side by side and extending across said central rotor opening so as to substantially close the said opening and a mass of impervious insulation extending through and about the core and coils and forming a housing open at one end and closed at the other, said coils being completely enclosed and hermetically sealed in the walls of said housing, the end turns at the one end of the core being contained in the side walls of said housing and the end turns at the other end of the core being contained in the end wall of said housing.

3. A dynamo electric machine stator comprising, a core having a central rotor opening and a plurality of spaced apart winding apertures around said central rotor opening, coils of insulated wire in said winding apertures, the end turns of said coils at the one end of the core being laid one above the other so as to clear said central rotor opening and at the other end of the core being laid side by side and extending across said central rotor opening so as to substantially close the said opening and a mass of imperivous insulation extending through and about the core and coils and forming a housing open at one end and closed at the other, said coils being completely enclosed and hermetically sealed in the walls of said housing, the end turns at the one end of the core being contained in the side walls of said housing and the end turns at the other end of the core being contained in the end wall of said housing, said side walls having radial openings extending therethrough between the said coils, and said end wall having axial openings extending therethrough between the said coils.

4. A dynamo electric machine stator comprising, a core having a central rotor opening and a plurality of spaced apart winding apertures around said central rotor opening, coils of insulated wire in said winding apertures, the end turns of said coils at the one end of the core being laid one above the other so as to clear said central rotor opening and at the other end of the core being laid side by side and extending across said central rotor opening so as to substantially close the said opening and a mass of impervious insulation extending through and about the core and coils and forming a housing open at one end and closed at the other, said coils being completely enclosed and hermetically sealed in the walls of said housing, the end turns at the one end of the core being contained in the side walls of said housing and the end turns at the other end of the core being contained in the end wall of said housing, said side walls having radial openings extending therethrough between said coils, and said end wall having axial openings extending therethrough between the said coils and a bearing bushing centrally supported in the closed end of the housing between the coils.

5. A dynamo electric machine comprising a stator as described in claim 4, a bearing head secured to the open end of said stator, a shaft having rotative bearing at one end in said bearing head and at the other end in the end wall of said stator, and a squirrel cage rotor secured to said shaft to rotate therewith.

In testimony whereof I affix my signature

VINCENT G. APPLE.